United States Patent [19]
Morofsky

[11] Patent Number: 5,743,429
[45] Date of Patent: Apr. 28, 1998

[54] DEVICE FOR DISPENSING CREDIT CARDS

[75] Inventor: Jacob Morofsky, So. Farmingdale, N.Y.

[73] Assignee: Debit Dial Vending Corp., Deer Park, N.Y.

[21] Appl. No.: 534,012

[22] Filed: Sep. 26, 1995

[51] Int. Cl.$^6$ .................................................. G07F 11/00
[52] U.S. Cl. .................. 221/7; 221/253; 221/258; 221/277; 271/35; 271/118
[58] Field of Search .................. 271/35, 118, 10.03, 271/10.08; 221/7, 8, 127, 131, 253, 258, 259, 277, 2

[56] References Cited

U.S. PATENT DOCUMENTS

| | | | |
|---|---|---|---|
| 3,791,392 | 2/1974 | Hanson | 221/7 |
| 4,591,069 | 5/1986 | Stewart | 221/129 |
| 5,110,107 | 5/1992 | Bieber | 271/35 |
| 5,127,546 | 7/1992 | Chen | 221/253 |
| 5,244,197 | 9/1993 | Helmstadter | 271/35 |
| 5,301,834 | 4/1994 | Lee et al. | 221/131 |

Primary Examiner—H. Grant Skaggs
Attorney, Agent, or Firm—Bauer & Schaffer

[57] ABSTRACT

A credit card dispensing device is disclosed which includes a frame with a central processing mounted to the frame. The central processing unit contains programming information pertaining to the operation of the device and serves to signal other components of the device to perform functions. A bill recognition system in electrical communication with the central processing and is configured to receive a manually inserted bill and determine the value of the bill. A digital display is provided to display information received from the central processing unit regarding dollar values and card selections. At least one card dispensing is provided to dispense preprogrammed credit card credit cards based upon user selections.

10 Claims, 6 Drawing Sheets

DEVICE FOR DISPENSING CREDIT CARDS

FIELD OF THE INVENTION

The present invention relates generally to a device for dispensing credit cards, more particularly, to an automated device for dispensing credit cards with preprogrammed monetary value encoded thereon.

BACKGROUND OF THE INVENTION

The use of credit cards has become the preferred method of purchasing by consumers. No longer is cash the dominant way consumer goods and services are purchased. Further, the acceptance of credit cards has expanded into the use of prepaid money cards. For example, recently telephone companies have offered phone money cards having preprogrammed dollar values encoded thereon. Railroad and subway cards have also been developed which, like the phone credit cards, have preprogrammed dollar values which are electronically deducted according to fares used by the card holder.

With the increased convenience with the use of money cards for transportation and phone services comes an increased demand by the consumer to obtain these credit cards. Currently, these cards are purchased directly at the offices of the issuer or through the mail. For example, phone money cards are purchased from the phone company and sent to the purchaser via the mail. Unfortunately, and as any phone or subway user can attest, when your card "runs out" of money, purchasing by mail won't pay for an urgent call or the last train. A need therefore exists for an automatic money card dispensing device which can dispense preprogrammed, prepaid cards directly to the consumer in exchange for cash.

The transportation industry has developed one form of dispensing machine which can be located at train stations and operated directly by the consumer. The train fare dispensing machines typically accept various denominations of bills, ask the consumer to input the desired amount of credit to be programmed on a card, and issue a card with the imputed selection along with change if appropriate. These machines are configured to perform credit encoding on magnetic strips on one side of a "blank" card. That is, the machine contains a volume of blank cards having no credit value thereon, and in response to user commands and cash input, encodes and dispenses an encoded card of selected credit value.

Unfortunately, these programming machines are complex as they must be equipped with mechanisms to encode cards, and store, calculate, and dispense change. A resulting aspect of the complexity of the programming machines is an increased cost of the machine, higher likelihood for breakdown, and higher cost of service of the machine. For example, users of these machines may encounter a machine which is out of change, or issues change in an undesirable form of currency, such as Susan B. Anthony Dollar coins which often get confused with quarters. Further, users who are commuters in a rush, often experience difficulty in operating the machines as a result of the number of choices available in programming. A need, therefore, exists for a simple money card dispensing machine which can dispense preprogrammed money cards at desired dollar values with a minimum of user input.

These objects together with numerous advantages will be apparent from the following disclosure of the present invention.

SUMMARY OF THE INVENTION

Briefly stated, the present invention comprises a money card dispensing machine having several dispensing units, each capable of storing a stack of preprogrammed cards of specific denomination, and means for selectively activating one or more of the units to deliver to the customer one or more of the selected programmed cards. The machine includes a central processing unit containing programming information pertaining to the operation of the device, a bill recognition or validation system controlling the dispensing of the cards from storage on payment from the user.

Full details of the present invention are set forth in the following description of the invention.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings a preferred embodiment of the present invention. It should be understood, however, that the invention is not limited to the precise arrangements and instrumentalities shown. In the drawings.

DETAILED DESCRIPTION OF PREFERRED EMBODIMENTS

Figure 1:
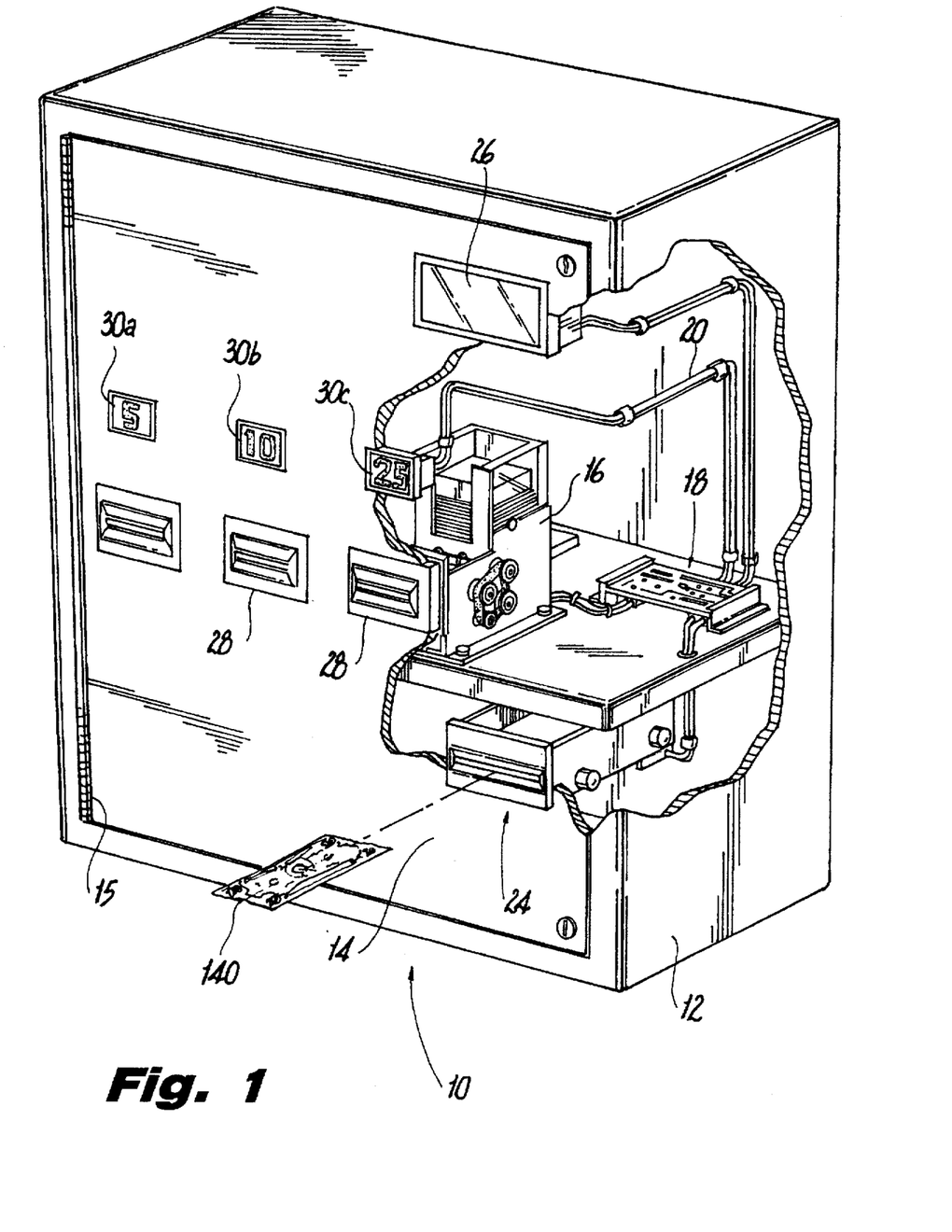
FIG. 1 is a perspective view of a money card dispenser constructed in accordance with a preferred embodiment of the present invention.

Referring now to the drawings in detail, wherein like numerals are used to indicate like elements throughout, there is shown in FIG. 1 a card dispensing machine, generally designated 10, in accordance with the present invention. Device 10 includes a generally rectangular frame 12 defining an internal compartment 14 closed by a frontal face 14 which is hinged along a side edge 15 to the frame and provided in conventional manner with a lock and key or other securement. In this way the interior compartment is accessible for service, yet is secure against common theft.

With continued reference to FIG. 1, mounted to the frame 12 within internal compartment are a plurality of card dispensing units 16 three of which are illustrated here, for example only. Card dispensing units 16 are in electrical communication with central processing unit 18 via cables 20. Mounted to the frame 12 and having an inlet in the face 14 of frame 12 is a bill recognition system 24. The bill recognition system 24 is in electrical communication with central processing unit 18 and is configured to receive bills, determine their denomination, and signal the central processing unit 18 as to the value of the bill.

With continued reference to FIG. 1, a digital display 26 is mounted to the face of 14 of frame 12 and also is linked electrically with the central processing unit 18. The digital display 26 is disposed to display dollar value and other user information received from the central processing unit 18. Each of the card dispensing unit 16 has a dispensing slot 28 open on the face 14 of the frame 12 and a number of operating buttons 30 providing the dollar choice selection for the user. The buttons 30 are electrically linked with the central processing unit 18 to communicate the user's selection.

Currency or bill validators are also well known, capable of determining validity and denomination of currency. Combining the bill validator and the CPU are also known. Therefore, neither CPU or bill validator need be further detailed here, and reference to commercial and well known facilities may, if desired, be made. The system described hereinafter illustrates a device having preferably three dispensing units, one 30a for $5 money cards, one 30b for $10 money cards and one 30c for $20 money cards. The actual denominations do not matter.

Figure 2:
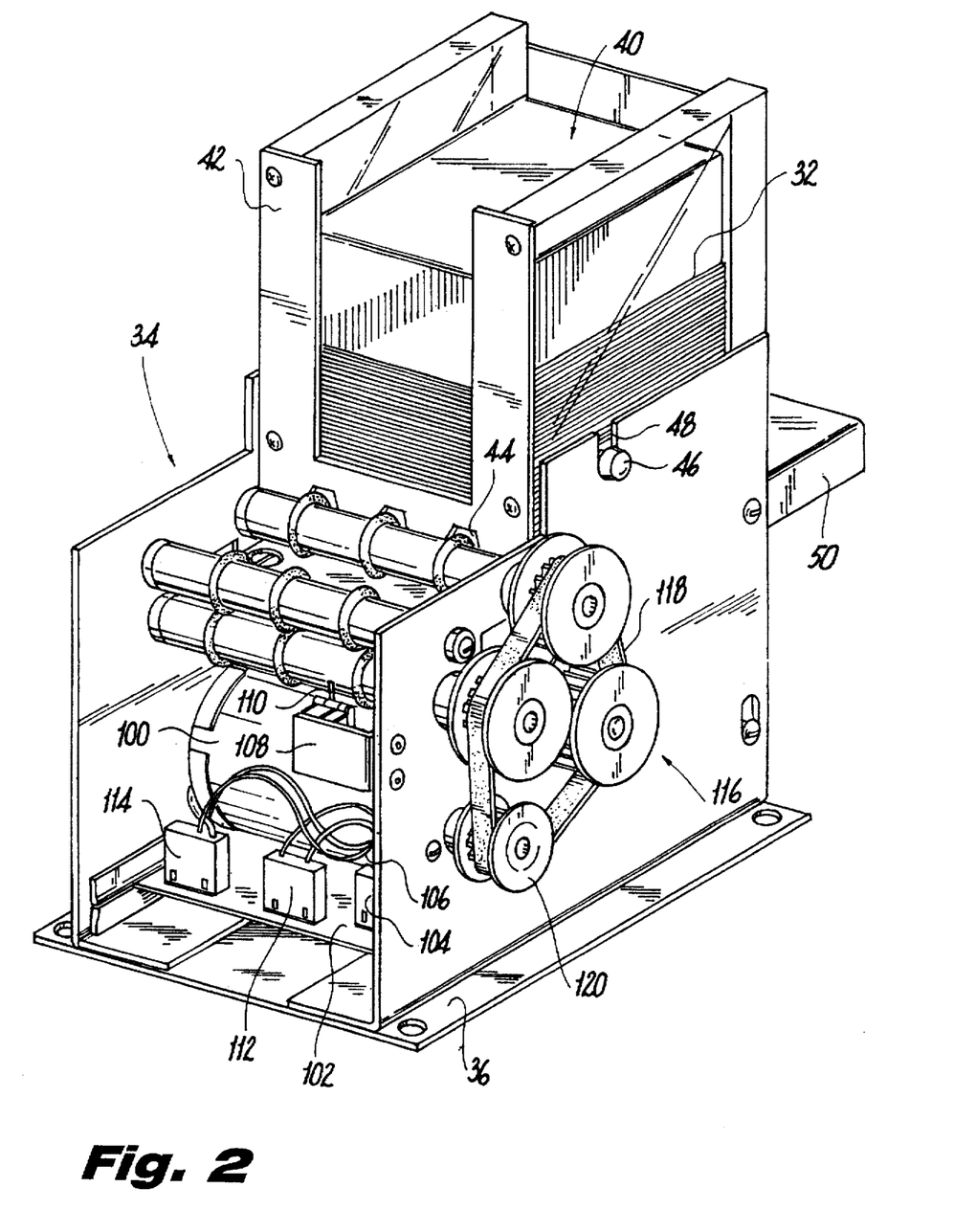
FIG. 2 is an enlarged perspective view of the card dispensing mechanism employed in the dispenser of FIG. 1.
Figure 3:
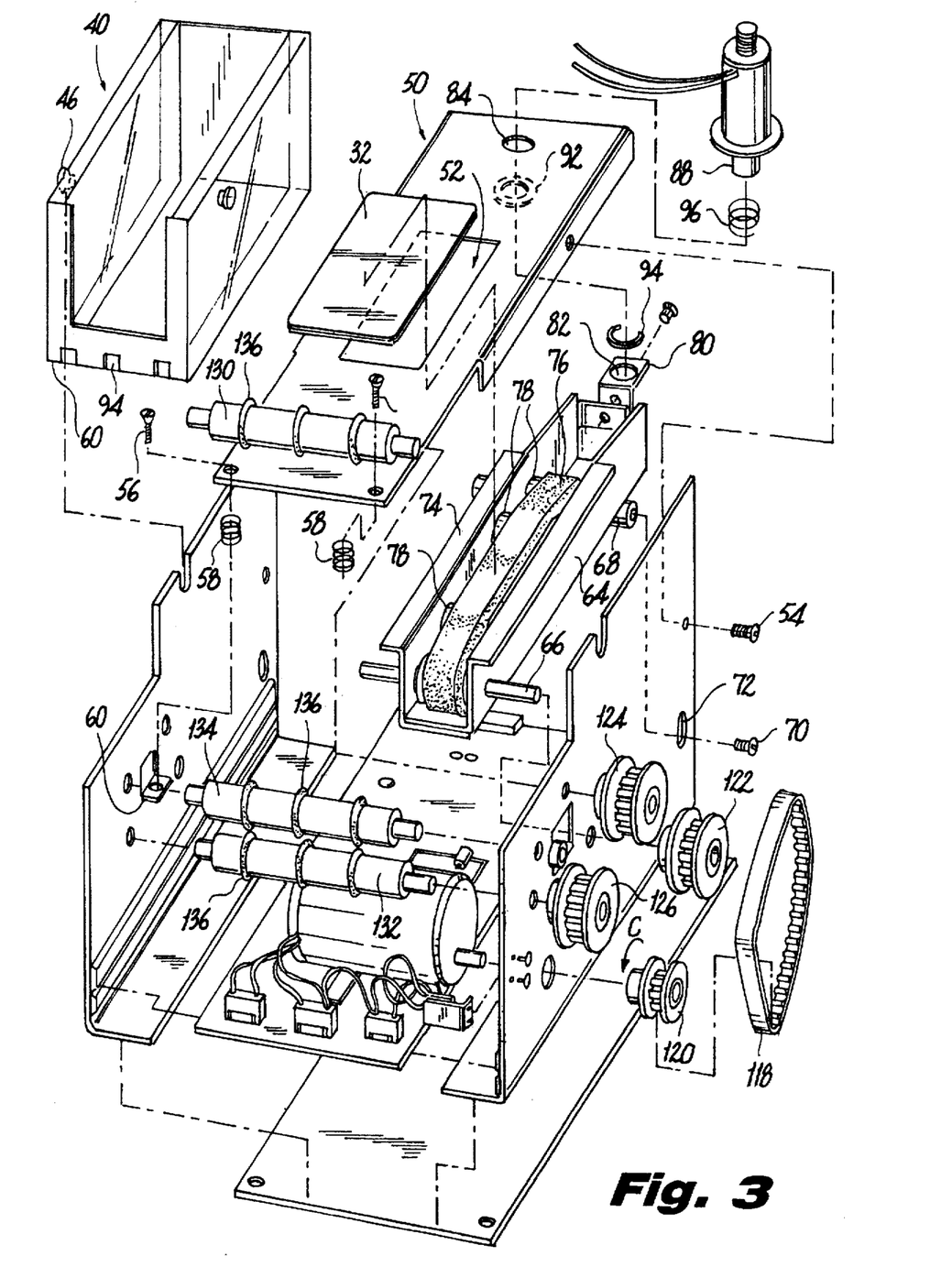
FIG. 3 is an exploded view of the dispensing mechanism of FIG. 2 illustrating the components thereof.

With reference now to FIG. 2–3, it is to be noted that all three of the card dispensing units 16 are designed to hold cards 32 stacked one upon another. The design of the dispensing mechanism 16 is irrespective of the dollar value of the card 32 contained therein. Card dispensing unit 16 comprises a housing 34 formed of a horizontal base plate 36 and two vertically extending side walls 38 welded or otherwise secured thereon, adapted to receive a stacker 40 and the various dispensing mechanisms such as pusher and rollers to be described in greater detail hereinafter.

The card stacker 40 comprises an open top and bottom parallelepiped chute-like having width and depth dimensions conforming to the cards 32 and a height to hold a large supply of such cards in a horizontal manner. The stacker 40 has a frontal wall 42 partially open so as to provide access to the stacked cards 32. The front wall 42 is also provided with a plurality of spaced notches 44 along its bottom edge. The stacker 40 is removably secured between the side walls 38 of the housing 34 by providing the sides 44 of the stacker with laterally protruding screws 46 which fit into notches 48 formed on the upper edge of the housing side walls 38. In this manner stackers 40 conforming to selected sized cards may be easily exchanged.

Preferably the stacker 40 is constructed of a clear plastic to assist the operator of the device 10 in visually inspecting the number of cards 32 contained in the stacker. Although a clear plastic is preferred, the container 40 may be made of metal, and whether made of metal or plastic may have suitable holes or slots to provide both physical and visual access to the cards therein.

As seen in detail in FIG. 3, the stacker 40 is located directly above a pivotable table 50 having a central rectangular opening 52 slightly smaller than the dimensions of the card 32 so that the cards 32 fall directly onto the opening 52. The table is secured to the housing side walls 36 by pivot screws 54 located about one-third the distance from its rear end while at its front end the table 50 is secured by set screws 56, about each of which is located a compression spring 58, and each of which is threaded within a mating hole in an inwardly directed bracket 60 on which the springs 58 rest. In this manner by placing an upward or downward force on the rear end of the table 50, the table will pivot about the pivot screws 54.

The stacker 40 is mounted so that at least the bottom edge 60 of its front wall 42 (i.e. the wall with notches 44) is spaced above the table 50. Preferably this space is minutely greater than the thickness of a single card 32 allowing the card to be pushed through the spaces, as will be described hereinafter. By adjusting the position of thumb screws 46 holding the stacker 40 this space may be easily changed.

Mounted directly below the table 50 is a U-shaped channel member 64 mounted at its front end to the side walls 38 of the housing by a rotatable axle 66 and at its rear end by a support bar 68 into which a set screw 70, passing through a vertical slot 72 in the side walls 36 is secured. The slot 72 permits the rear end of the channel member 64 to be movable up and down causing the channel member to pivot bout the axle 66. The channel member 64 is formed with horizontal extending flanges 74 adapted to abut against the bottom of the table 50 to limit its movement.

Mounted within the channel member 64 is a continuous drive belt 76 disposed about a drive roller fixed on the axle 66 and three guide rollers 78, which are arranged so that the central portion of the drive belt run fits within the opening 52 in the table 50, thereby being able to contact the cards 32 which fall thereon and of moving the lowermost card forwardly from the stack over the table 50. The belt 76 is formed with a high friction surface in any known manner.

An L-shaped bracket 80 is mounted at the rear end of the channel member 64. The rearwardly extending leg of the L-shaped bracket 80 is provided with a hole 82 aligned with a similar hole 84 in the rear end of the table 50. Mounted on the table 50 is a piston/cylinder solenoid 86 so that its piston 88 extends through the holes 82 and 84. The body of the solenoid 88 is secured to the table 50 by a nut 92 threaded about the piston nipple below the table while the piston 90 is itself secured to the L-shaped bracket 80 by a C-clip 94 and a spring 96 arrange about the piston 90. The solenoid, of course, is connected to the central processing unit 18 and upon receipt of suitable signal therefrom, operates to draw the table and channel member toward each other or to move them away from each other and place the drive belt 76 into or out of contact with the card 32.

Referring once again to FIG. 2 an electric motor 100 is mounted between the side walls 36 of the housing above a circuit board 102. Mounted on circuit board 48 is sensor connector 104 linked via wires 106 to a micro-switch 108 equipped with an extending counter arm 110 which can be rotated through contact with a card 32 moving off the table 50. The micro-switch 104 is of common design an is configured to send electrical signals through circuit board 112 when counter arm 102 is tripped or moved between a first position and a second position. A motor connector 112 is also mounted to the circuit board 102. A solenoid connector 114 is mounted to circuit board 48 and electrically connects the solenoid 88 to the circuit board 102.

The circuit board 102 is, of course, connected to the central processing unit 18 and upon receipt of the appropriate signal controls, the operation of the motor 100, the drive belt 76, and the dispensing counter 110 may be effected.

Mounted on the exterior of one housing side wall 38 is a transmission system 116 comprising a continuous transmission belt 118 having teeth on its inner surface mating with a plurality of gears 120, 122, 124 and 126. Gear 120 is mounted at the end of the output shaft 128 of the motor 100. Gear 122 is mounted at the end of rotatable axle 66 driving the dispensing belt 76. Gear 124 is connected to the axle of pusher roller 130 located just above the plane of the table 60 and just ahead of the front of the card stacker 40. Lastly, the gear 126 is connected to the axle of a second pusher roller 132 located between the end of the table 50 and the entrance to the card expulsion slots 28. An idler roller 134 is mounted just above the second pusher roller 132. All of the rollers 130, 132 and 134 are provided with high function ring grips 136 to insure grasping of the card 32. The roller 130 is arranged so that its ring grips 136 fit with the notches 44 formed on the lower edge of the front wall 42 of the stacker 40. This enables the roller 130 to more effectively act against the card 32 moving on the table 50. Suitable journals may be provided for the axles of the rollers to mount them to the housing walls 36.

Before turning to the operation of the system, it will be understood that the money cards are pre-loaded with their denomination and total value. They are supplied by the issuer such as, for example, the phone or transit company and carefully accounted for. Each dispensing unit 34 is arranged to handle only one denomination. The CPU 18 is arranged to coordinate the desired purchase, i.e. denomination, number of cards, receipt of the proper amount of payment and the validity of the means of payment and to deliver to the appropriate dispenser unit the appropriate signals. The CPU also counts the money received, down-counts the cards dispensed and generally controls the operation of the system. CPU's are commercially available, either preprogrammed or programmable to accomplish such operation. The display, coordinated with the CPU, makes a visual indication and record of the machine transactions.

Figure 4:
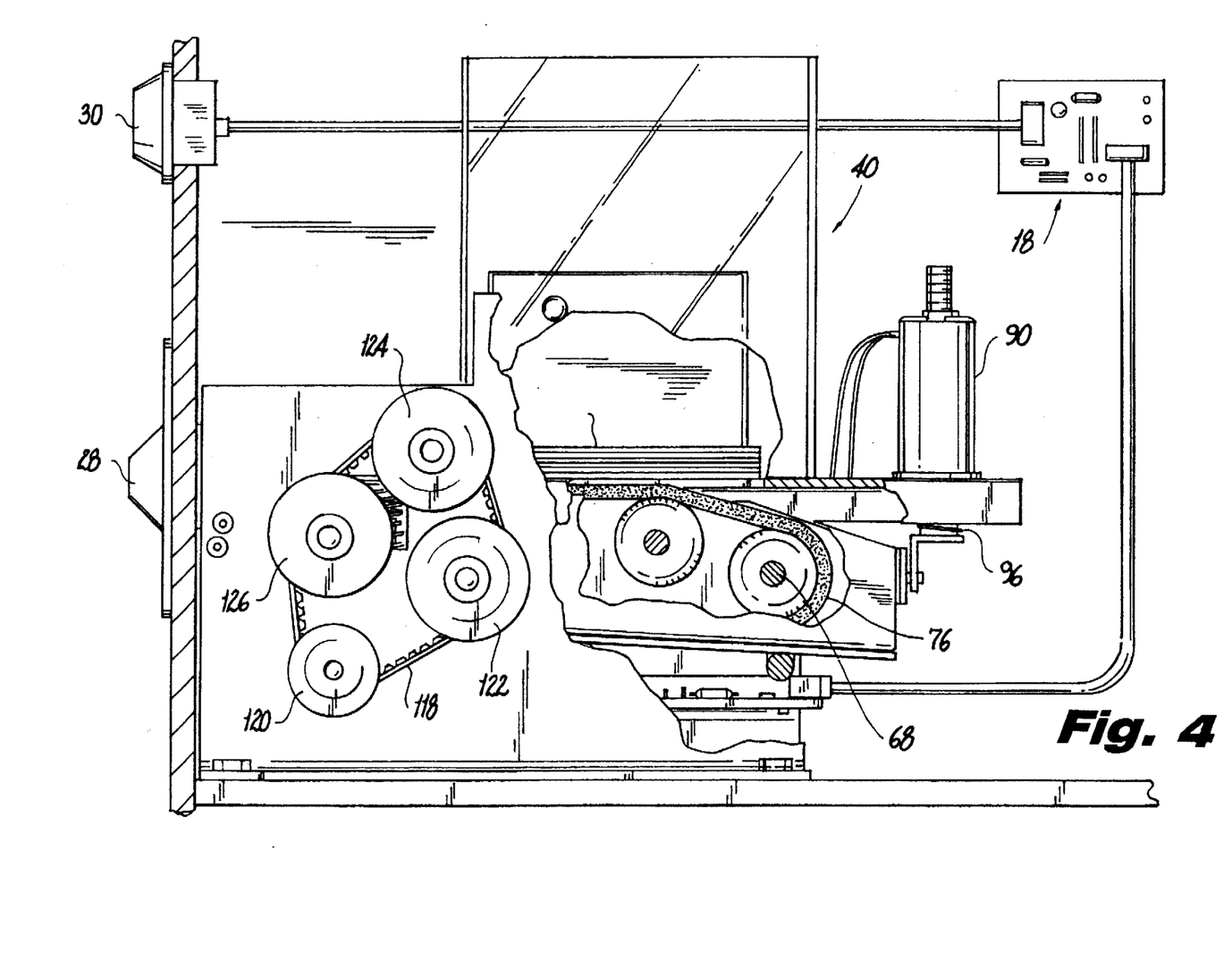
FIG. 4 is a partial sectional view of the dispensing mechanism of FIG. 3 illustrating the card dispensing mechanism at a rest position.
Figure 5:
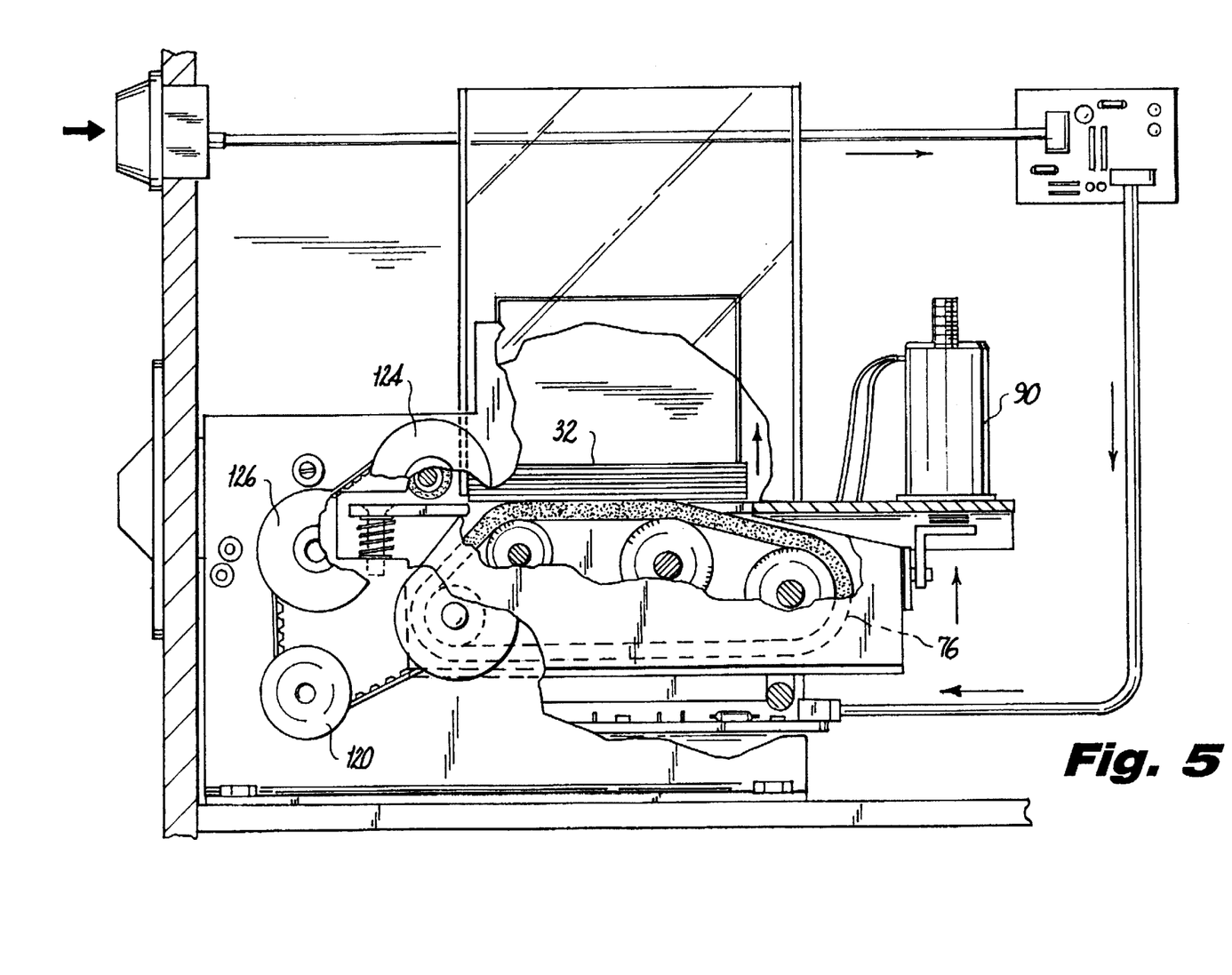
FIG. 5 is view similar to that of FIG. 4 illustrating the card dispensing mechanism in an activated position.
Figure 6:
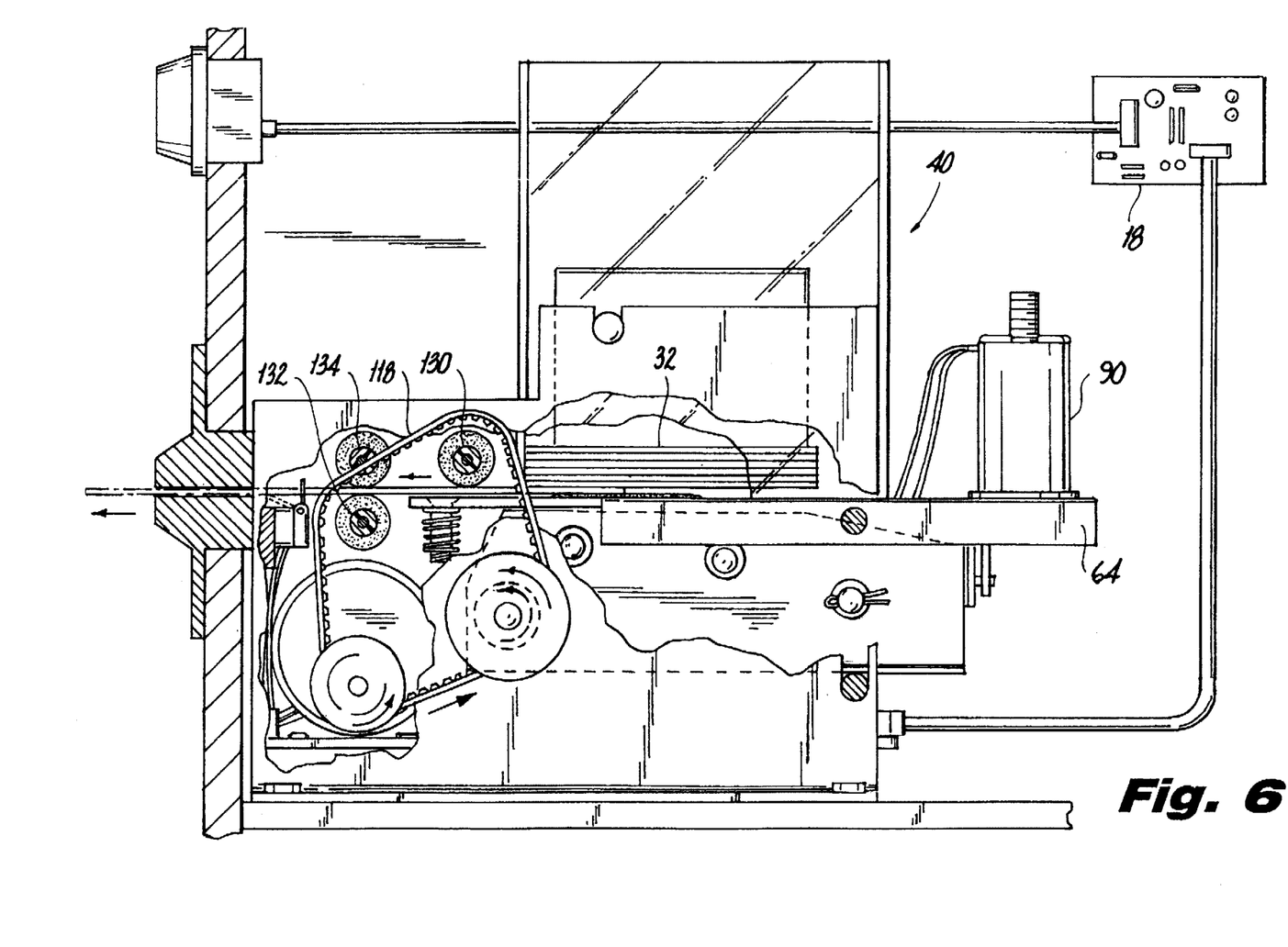
FIG. 6 is a view similar to that of FIG. 5 illustrating the card dispensing mechanism dispensing a card.

Referring now to FIGS. 4–6, the operation of the dispensing machine 10 will be described with specific reference to a single dispenser unit 16. In FIG. 4 the card dispensing mechanism is shown in a rest position wherein the piston 90 of solenoid 88 is extended, thereby pivoting the back of the channel member 64 downwardly separating the dispensing belt 76 from the bottommost card 32 in the stack. When the operator wishes to purchase a card(s) he inserts a bill 140 (FIG. 1) into the bill recognition system 24. The bill validator which determines the value of the bill, assumed for demonstration a $20 bill and signals the central processing unit that $20 has been received. The central processing unit 18 in turn signals the digital display 26 (FIG. 1) to display the amount received. The user can then choose between adding additional bills into the machine 10 or simply choose to receive a card or cards totalling $20 in value. Assume the user wishes to receive one $10 card and two $5 cards, he can then input his selection by depressing the $5 button 30a twice and the $10 button 30b once. If the user decided he wanted one $20 card, he or she could have simply pressed the $20 button 30c once.

In response to the $5 button 30a being depressed, the central processing unit activates the $5 card dispensing mechanism 16 so that sequentially solenoid 88 moves its piston 90 in an upward direction as indicated by arrow "B" (FIG. 5) lifting the attached table 50 by overcoming the force of springs 96 and placing flanges 74 into contact with the underside of the table 50. In this activated position the dispensing belt 76 is placed into contact with the bottommost card 32 stored within the stacker 40. Shortly thereafter, the central processing unit 18 signals motor 46 to turn on. Motor 46 rotates drive gear 120 in a counter clockwise direction moving transmission belt 118 in a direction indicated by arrow "C" in FIG. 6. Transmission belt 118 simultaneously causes the dispensing belt 76 to move and push the card 32 forward into engagement with the pusher rollers 130 advancing the card 32 toward and between the rollers 132 and 134. As the card 32 advances into contact with the micro-switch 108 the card trips the sensor. Once the card 32 has passed the counter arm 110, the micro-switch is permitted to return to its rest position and the sensor 108 signals the central processing unit 18 that one card 32 has been dispensed. The central processing unit 18 responds by terminating the operating cycle. The card 32 is left partially extending out from the face slot 28 in the face of the frame so that he user may manually grasp and remove the card. The machine 10 is reset by the central processing unit 18 and the process repeated twice for the two $5 cards. The entire purchasing process being repeated for each customer.

The present invention overcomes the earlier described complexity problems by providing a simple dispensing machine which can dispense preprogrammed money cards at fixed dollar values with a minimum of user input. Thus, the device of the present invention is cost effective, less subject to breakdown than more complex devices, and will accurately dispense preprogrammed money cards in response to user input.

Another practical advantage of the present invention is that the money card dispensing device of the present invention does not store or dispense change. Rather the device contains cards preprogrammed with dollar values equal to that of the most common currency denominations, for example $5, $10, and $20 cards. The choices available to the user are preferably limited to these cards, for example, a user who inserts a $20 bill can choose between one $20 card, two $10 cards, a $10 card and two 5$ cards, or four $5 cards, of course, in certain venues such as casinos, race tracks, etc. the limited values can be substantially raised.

Several advantages will be apparent from the foregoing description. For example, because the money card stacker is easily removable various stackers may be pre-filled and maintained so that replacement cards may be quickly inserted in the unit, thereby decreasing down-time.

Further, because the position of the lower edge of the stacker with relationship to the table is dependent upon having of the stacker on the upper edge of the side walls of the housing, the clearance between the lower edge of the stacker and the table is adjustable. Thus, thin or thick cards can be dispensed, as can two cards at once.

Because the solenoid acts to regulate the distance between the table and the dispensing belt, more or less pressure can be caused to be exerted by the dispensing belt on the card, as desired or needed.

More importantly, however, is the ability to control dispensing preventing errors, over-charging or over-dispensing.

From the foregoing description, it can be seen that the present invention comprises a credit card dispensing device. It will be appreciated by those skilled in the art that changes could be made to the embodiments described above without departing from the broad inventive concept thereof. It is understood, therefore, that this invention is not limited/to the particular embodiments disclosed, but is intended to cover modifications within the spirit and scope of the present invention as defined in the appended claims.

What is claimed is:

1. A card dispenser comprising a hopper for holding a stack of cards, a table arranged below and spaced from said hopper and on which said stack of cards rest, said table having an opening exposing the bottom surface of the bottommost one of said cards in said stack and means adapted to engage the bottom surface of said bottommost one of said cards for pushing the card from beneath said stack over said table and through the space between said hopper and table, said table being movable between a first position in which the bottommost one of said cards is in contact with the means for pushing said card from beneath said stack and a second position in which the bottommost card is spaced from and not in contact with said means for pushing said cards, means for normally biasing said table in said second position and means for selectively moving said table into said first position, whereby only selected ones of said cards are dispensed.

2. The card dispenser according to claim 1, wherein said means for pushing said card comprises a motor driven continuous friction belt arranged to contact said card through said opening in said table.

3. The card dispenser according to claim 2, wherein said function belt is movably mounted with respect to said table and provided with means selectively actuatable to move said belt into and out of contact with said card.

4. Apparatus for dispensing money cards on the payment therefor, comprising:
   (a) a chassis;
   (b) a central processing unit disposed within the internal compartment mounted to the chassis, said central processing unit containing programmable information pertaining to the value of the cards, the payment of the apparatus for a selected number of such cards and for the operation of the apparatus;
   (c) a bill recognition system for determining the value and validity of the payment made to the apparatus;
   (d) at least one card dispensing mechanism comprising:
      i) a card holder adapted to contain a stack of money cards;
      ii) an electric motor mounted to the chassis and in communication with the central processing unit, the electric motor having a rotatable drive shaft;
      iii) a gear assembly mounted to the chassis and engaged with drive shaft of the electric motor, the gear assembly configured to rotate in response to rotation of the drive shaft;
      iv) a conveyor belt linked to the gear assembly and movable in response to movement of the gear assembly;
      v) an actuating assembly comprising a table supporting said card holder, said table being pivotally mounted on said chassis, said table having an opening exposing said cards to said conveyor belt, means biasing said table to normally maintaining said table in a first position wherein said cards are spaced from said conveyor belt, means for moving said table in response to signals from the central processing unit between the first position and a second position in which the conveyor belt is in contact with at least one card;
   (e) a plurality of selection buttons mounted to the frame and in electrical communication with the central processing unit; and
   (f) wherein an operator can insert bills totalling at least a minimum amount into the bill recognition system and select through pressing the buttons the number and value of cards desired; and
   (g) wherein in response to user input through the pressing of buttons, the central processing unit will signal the at least one card dispensing unit to dispense at least one card.

5. The device as set forth in claim 4, wherein the at least one card dispensing mechanism further includes a sensor assembly mounted to the chassis, the sensor assembly in electrical communication with the central processing unit and adapted to count cards dispensed from the at least one card dispensing mechanism.

6. The device as set forth in claim 5, wherein the sensor assembly includes a counter arm, the counter arm movable between a first position and a second position, wherein when the counter arm moves from the second position to the first position the at least one card dispensing mechanism signals the central processing unit that a card has been dispensed.

7. The device as set forth in claim 5, wherein the actuating assembly further includes a solenoid in electrical communication with the central processing unit, the actuating assembly connected to the shelf and adapted to move the shelf between the first and second position in response to signals from the central processing unit.

8. The device as set forth in claim 4, wherein the at least one card dispensing mechanism comprises a first card dispensing mechanism, a third card dispensing mechanism, and a third card dispensing mechanism.

9. The device as set forth in claim 8, wherein the first card dispensing mechanism contains a plurality of preprogrammed cards each having a first dollar value encoded thereon, the second card dispensing mechanism contains a plurality of preprogrammed cards each having a second dollar value encoded thereon, and the third card dispensing mechanism contains a plurality of preprogrammed cards each having a third dollar value encoded thereon.

10. The device as set forth in claim 1, wherein the table is pivotally attached adjacent one edge to said chassis and includes a solenoid in electrical communication with the central processing unit, said solenoid being adapted to move the table between the first and second position in response to signals from the central processing unit.

* * * * *